Dec. 10, 1968    J. F. LYNCH ET AL    3,415,874
PROCESS OF REACTING SULPHUR TRIOXIDE
Filed Sept. 18, 1964    6 Sheets-Sheet 3

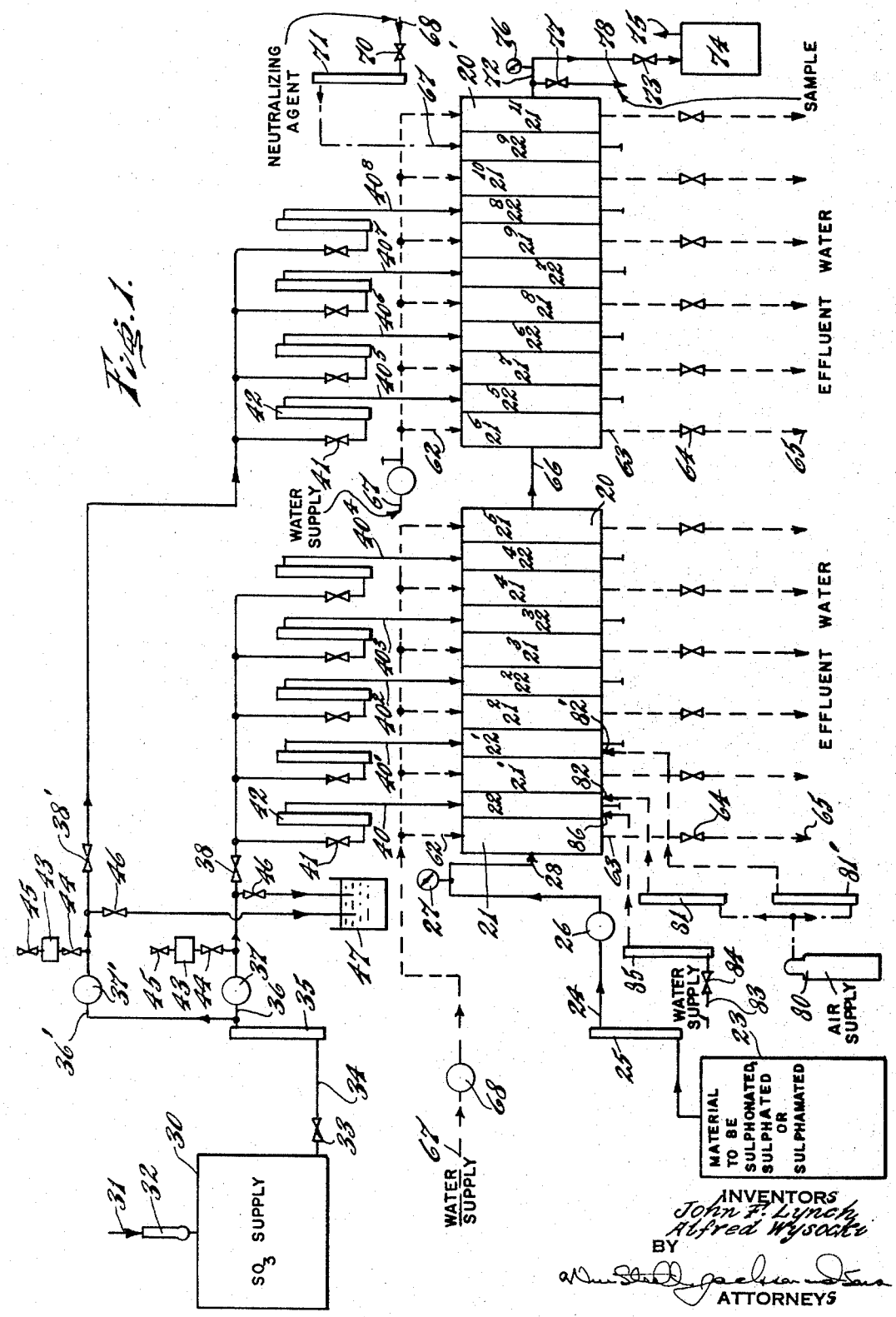

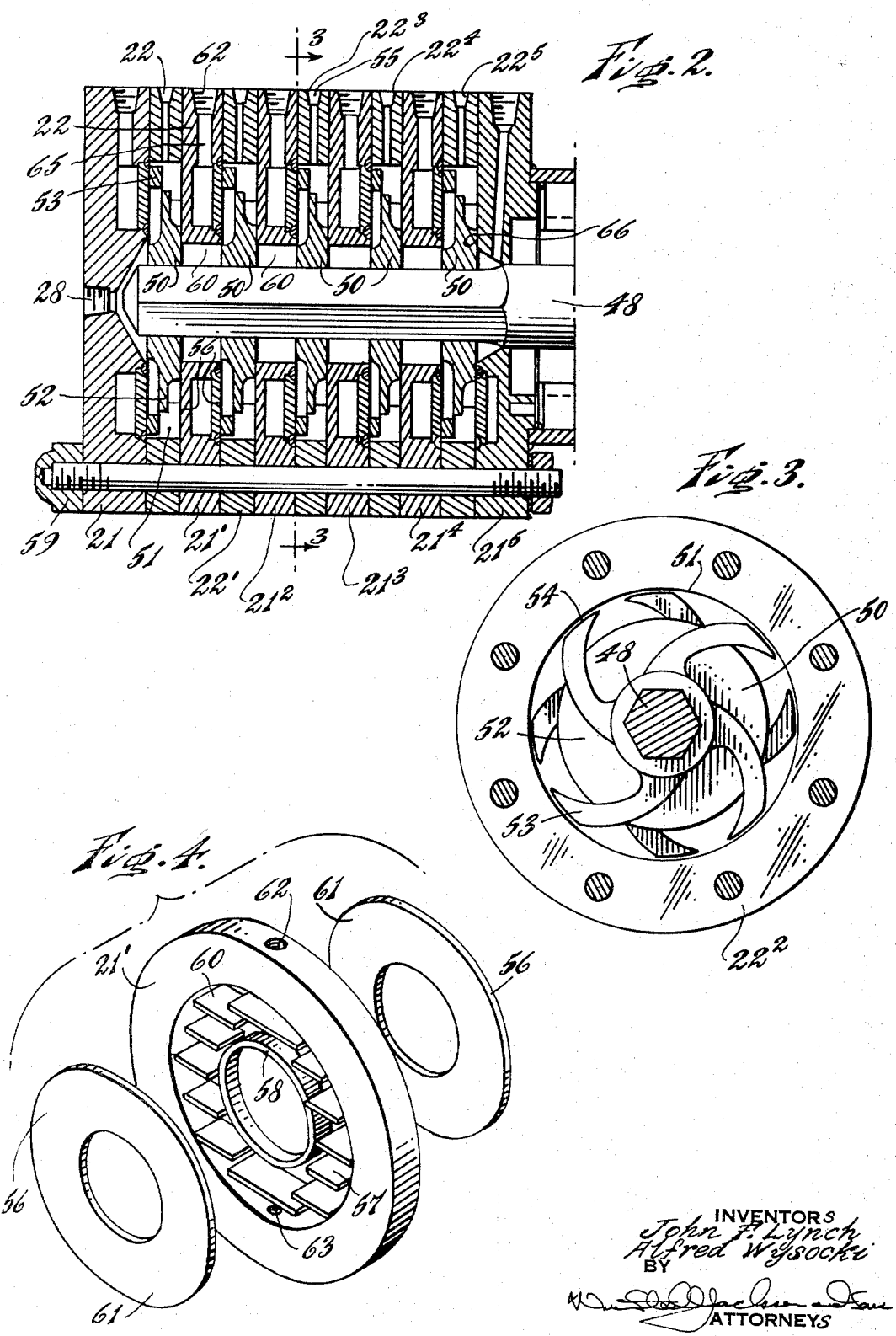

INVENTORS
John F. Lynch
Alfred Wysocki
BY
ATTORNEYS

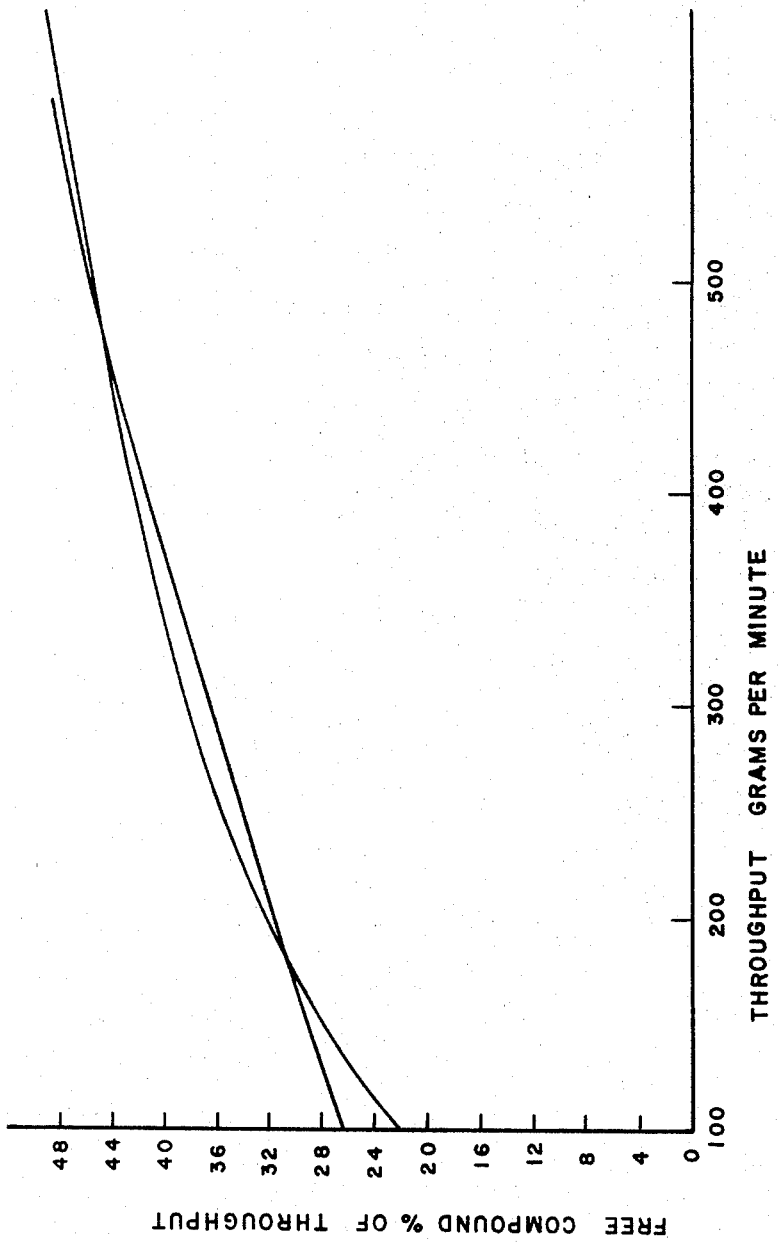

Dec. 10, 1968  J. F. LYNCH ET AL  3,415,874
PROCESS OF REACTING SULPHUR TRIOXIDE
Filed Sept. 18, 1964  6 Sheets-Sheet 5
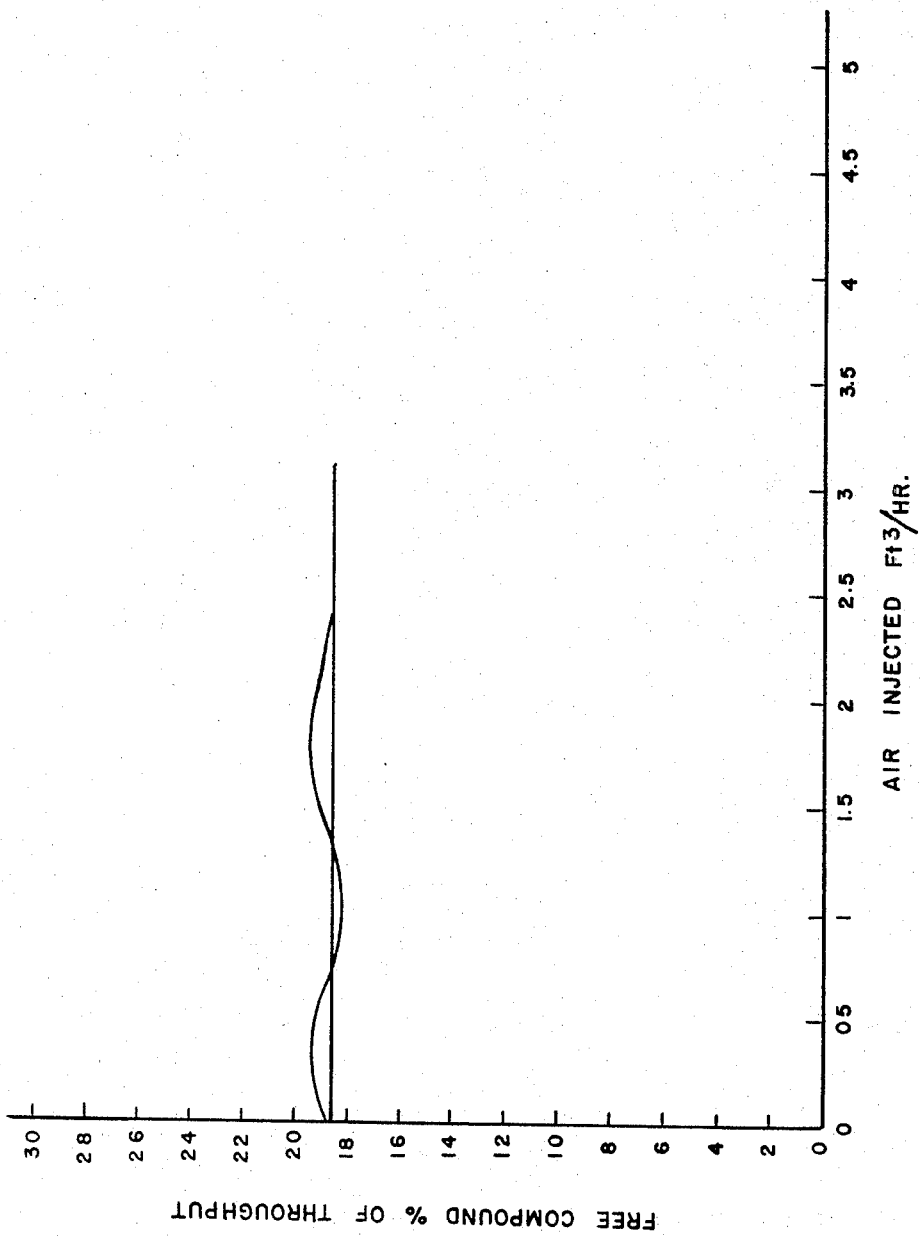
INVENTORS
John F. Lynch
Alfred Wysocki
BY
ATTORNEYS

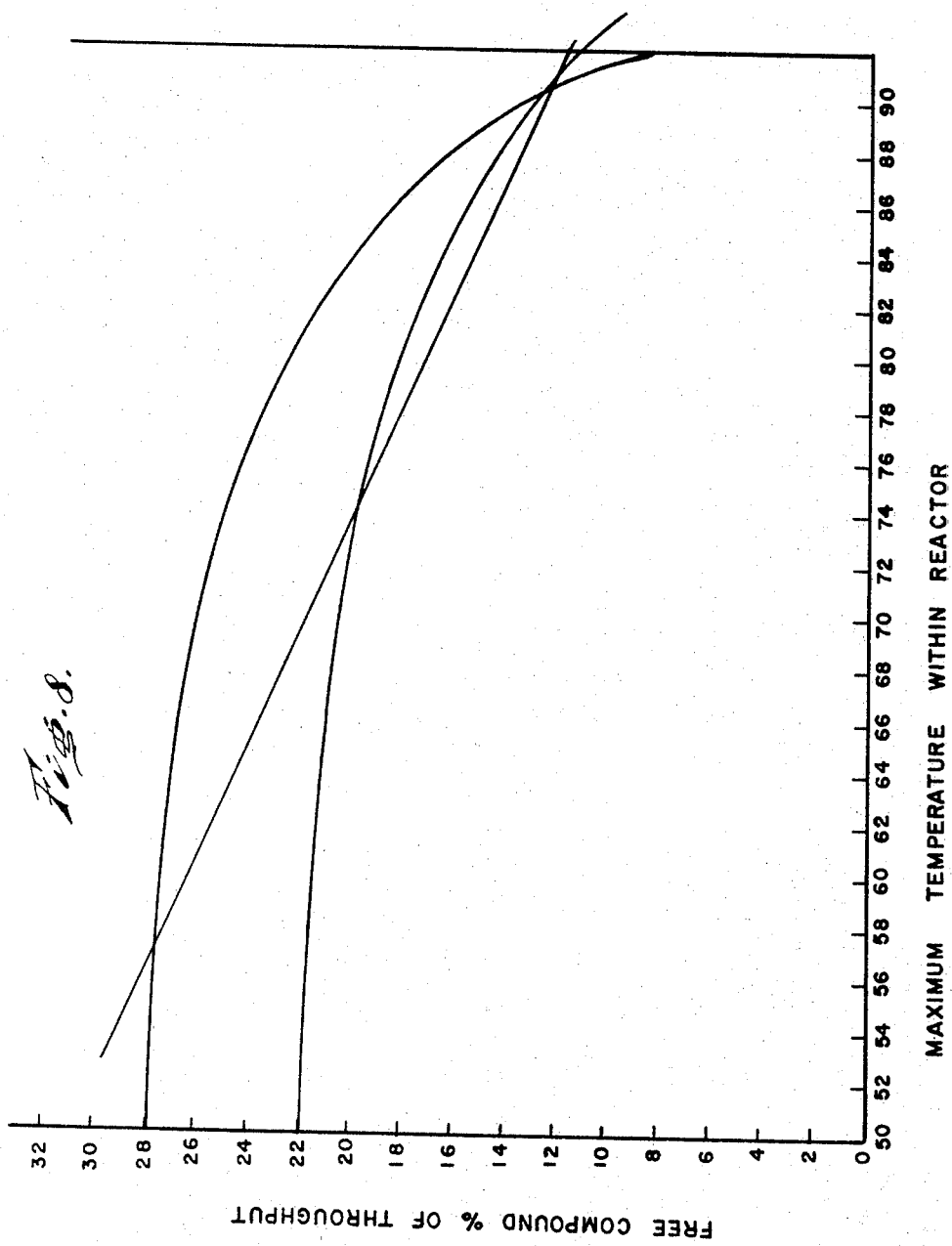

United States Patent Office 3,415,874
Patented Dec. 10, 1968

3,415,874
PROCESS OF REACTING SULPHUR TRIOXIDE
John F. Lynch, Chester, and Alfred T. Wysocki, Chadds Ford, Pa., assignors to Marco Development Company, Inc., Wilmington, Del., a corporation of Delaware
Filed Sept. 18, 1964, Ser. No. 397,509
3 Claims. (Cl. 260—505)

ABSTRACT OF THE DISCLOSURE

The present invention relates to a process of reacting sulphur trioxide in liquid form with an organic compound in liquid form using a continuous reactor which has mixing impellers acting adjacent to heat transfer surfaces. The organic compound passes continuously through the reactor in contact with at least four and preferably at least nine sets of impellers and heat transfer surfaces. In order to prevent backfiring, liquid sulphur trioxide is projected into the organic compound at at least four impellers at a speed of at least 0.35 feet per second and at a point not in excess of 0.5 inch from a heat transfer surface. Within a time of not less than 0.5 second from introduction of the liquid sulphur trioxide the mixture of organic compound and liquid sulphur trioxide is subjected to liquid shear against a heat transfer surface. In a preferred embodiment the amount of sulphur trioxide projected at the later impellers is increased with respect to that projected at the earlier impellers at geometrical progression.

DESCRIPTION OF INVENTION

The present invention relates to reacting sulphur trioxide with an organic compound in liquid form, for example in order to form sulphonates, sulfates or sulphamates.

A purpose of the invention is to react sulphur and oxygen with organic compounds at lower cost with a minimum of side reactions, charring and degradation.

A further purpose is to obtain a higher yield in reacting a compound such as sulphur trioxide with an organic compound.

A further purpose is to make it possible to obtain an anhydrous sulphonation, sulphation or sulphamation, thus avoiding the necessity to eliminate water from the reaction product which would be brought in in excess with the reactants, or to ship water in the reaction product where it may not be desired.

A further purpose is to avoid the necessity to use a great excess of sulphur trioxide or the like.

A further purpose is to react sulphur trioxide with an organic compound in liquid form, using a continuous reactor which has mixing impellers acting adjacent to heat transfer surfaces, by progressing the organic compound in liquid form continuously through the reactor in contact with at least four sets of said impellers and heat transfer surfaces, projecting into the organic compound at each of the impellers at a speed great enough to avoid flashback of the reaction, liquid sulphur trioxide at a point not in excess of 0.5 inch from a heat transfer surface, so that cooling will be immediately available, and within a time of less than 0.5 second from introduction subjecting the mixture of organic compound and sulphur trioxide to liquid shear against a heat transfer surface and thereby intimately mixing the organic compound and sulphur trioxide and extracting heat of reaction therefrom.

A further purpose is to maintain the heat transfer surfaces adjacent the earlier impellers at a lower temperature than those adjacent the later impellers in the sequence of progression of the organic compound.

A further purpose is to provide at least nine sets of impellers and heat transfer surfaces and to introduce liquid sulphur trioxide against each of these impellers in a separate increment.

A further purpose is to project a greater amount of sulphur trioxide at the later impellers than that projected at the earlier impellers, desirably increasing the feed in geometrical progression.

A further purpose is to blow in a gas containing oxygen into the organic compound in the reactor, the gas desirably being air in a quantity of 0.013 to 0.109 cubic feet at standard conditions per pound of throughput of organic compound.

A further purpose is to modify the reaction where desired by introducing into the organic compound in the reactor from 0.1 to 3% by weight of water calculated on the throughput.

Further purposes appear in the specification and in the claims.

The drawings include apparatus useful for carrying out the process of the invention and curves illustrating results obtained by the invention.

FIGURE 1 is a flow diagram showing a typical embodiment of the process.

FIGURE 2 is a diagrammatic axial section of a series of impellers and heat transfer surfaces in a reactor which may be used in the invention.

FIGURE 3 is a transverse section through an impeller chamber on the line 3—3 of FIGURE 2.

FIGURE 4 is an exploded perspective of a heat transfer plate employed in the reactor.

FIGURE 6 is a graph plotting free compound against throughput total weight in grams per minute.

FIGURE 7 is a graph plotting free compound in percentage of the total throughput against cubic feet of air per hour at standard conditions injected.

FIGURE 8 is a graph plotting free compound in percentage of throughout against maximum temperature reached within the machine in degrees centigrade.

Figure 5:
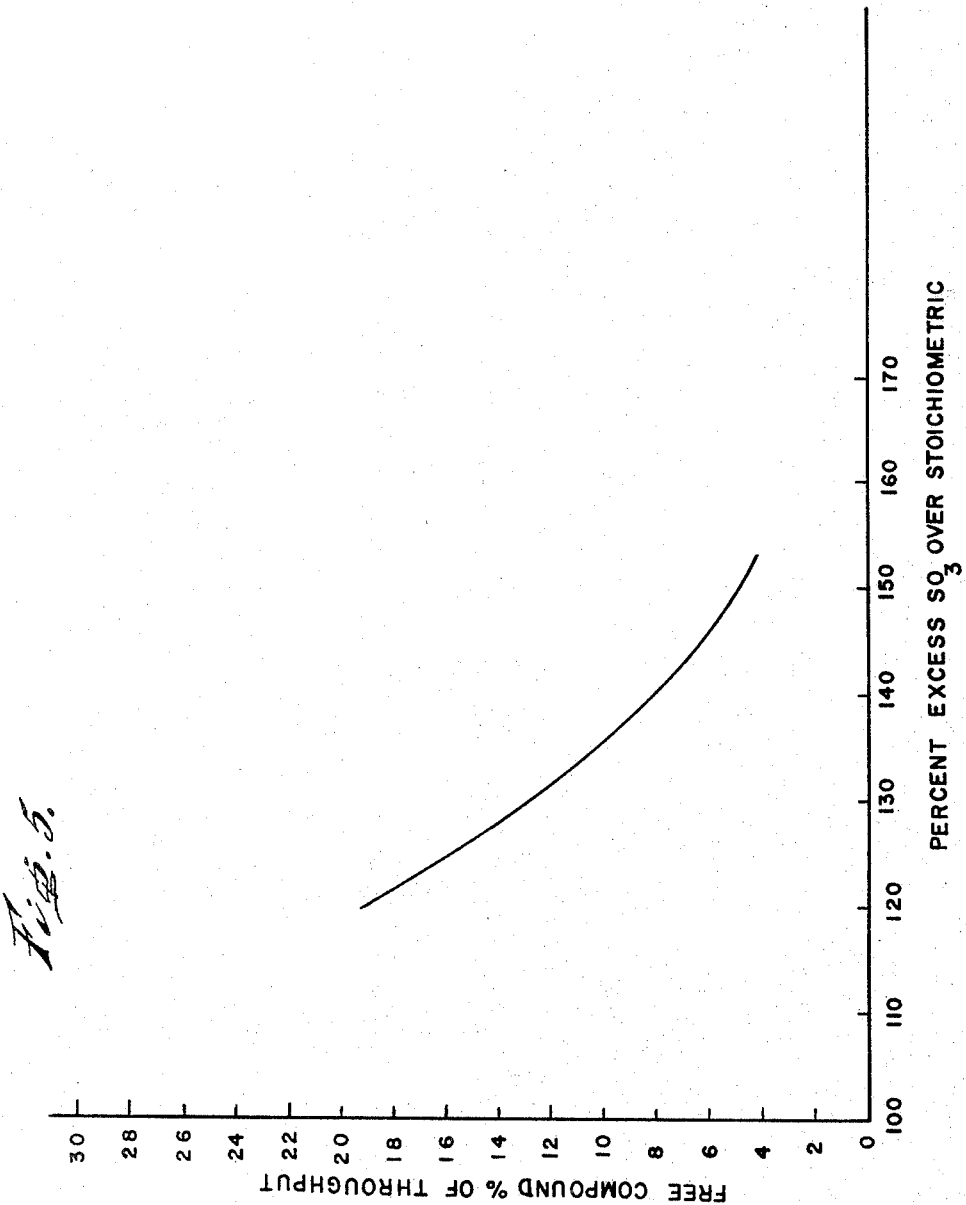
FIGURE 5 is a graph plotting free compound against percentage of excess of sulphur trioxide over the stoichiometric quantity.

A typical apparatus for carrying out the process of the present invention is shown in John Marco U.S. Patent No. 2,944,877, granted July 12, 1960, for Chemical Apparatus for Continuous Reactions, Heat Exchanging, Mixing, Cooking and Other Chemical Processes.

Numerous processes have been developed in the prior art for producing reactions of the character of sulphonation where the product would normall be $RSO_3H$, sulphation where the product would normall be $ROSO_3H$ and sulphamation where the product would normally be $R_2NSO_3H$.

The present invention concerns processes for this purpose which overcome certain of the difficulties previously encountered in the prior art.

One difficulty in the prior art has been that the product has tended to be dark in color due to charring. One advantage of the present invention is that light colored reaction products with sulphur trioxide can be obtained at low cost.

Another difficulty in the prior art is that side reactions have tended to reduce the yield of the desired product. The present invention cuts down on the incidence of side reaction, which may express themselves by degradation of the product produced.

Efforts have been made in the prior art to produce sulphonation, sulphation and sulphamation reactions by vaporizing $SO_3$ and then causing the reaction to occur with the vapor phase $SO_3$. This involves very complicated and relatively expensive equipment which is avoided by the present invention, in which liquid phase $SO_3$ is caused to react, eliminating the need for creating and handling $SO_3$ vapor.

In some of the prior art practices where sulphuric acid in the form of oleum or the like has been employed, needless and undesired quantities of water have been present which are costly to eliminate and which add to the bulk of the finished product. By the present invention the sulphonation, sulphation or sulphamation can be carried out in an anhydrous system where desired.

Also in some of the prior art practices a great excess of the sulphonating agent or the like has been employed. In the present invention it is no longer necessary to use such a large excess.

Some of the prior art practices have produced objectionable waste disposal problems, either by creating sulphur contents in gases which are difficult to eliminate, or by requiring disposal of objectionable liquids. This is avoided by the present invention.

The liquid $SO_3$ which is used in the present invention can be obtained from any suitable source, for example a sulphur burner or catalytic $SO_3$ plant, and will normally be substantially pure $SO_3$, with an $SO_3$ content of better than 99% by weight and in most cases better than 99.5% by weight.

The liquid $SO_3$ is supplied on a continuous basis under proper control of proportions to an organic compound in liquid form with which the reaction is to take place. The organic compound will either be a liquid or be capable of being reduced to a liquid as by the presence of a solvent.

The excess of $SO_3$ over the stoichiometric requirements in most cases will be of the order of 20 to 40% as later explained, but it will be evident that, depending on the difficulty of producing reaction, the excess of $SO_3$ above the theoretical quantity can be increased or reduced as desired.

In accordance with the present invention, the reaction is carried out in a continuous reactor which has a series of reaction chambers, each of which is provided with a mixing impeller acting adjacent to heat transfer surfaces from which heat transfer can be accomplished by a heat transfer medium as later described. Each of the impellers is provided, as also explained more in detail later, with an inlet jet or orifice opening by which the liquid $SO_3$ can be introduced.

The organic compound in liquid form is thus progressed through the reactor chambers and successively comes in contact with one impeller and its heat transfer surfaces and then another impeller and its heat transfer surfaces, passing through at least four sets of impellers and heat transfer surfaces in the process of the invention. This permits incremental addition of $SO_3$ in a manner as later explained which minimizes damage or deterioration of the organic compound and reduces the side reactions.

One of the important aspects of the present invention is the avoidance of backfiring of the reaction at the $SO_3$ inlet jets, which has previously been a serious obstacle in the way of sulphonation with $SO_3$ directly.

It is important in the present invention to prevent backfiring of the reaction by introducing the $SO_3$ at too slow a speed. Our experiments indicate that the minimum speed for introducing the $SO_3$ without backfiring is 0.35 feet per second and for best results the speed should exceed 0.7 feet per second. We have used in some cases with success speeds as high as 8 or 10 feet per second. The size of the orifice is not critical, although in many cases we have used an orifice size of about 0.015 inch diameter, with a throughput of about two grams per minute in the first orifice or about 65 grams per minute in four orifices. It should be kept in mind that the pressure on the $SO_3$ must overcome the pumping pressure on the compound being reacted and also the centrifugal pressure on the compound.

When the $SO_3$ encounters the organic compound, it is important that the $SO_3$ contact the organic compound for the first time in an environment favorable for immediate mixing of the $SO_3$ and the compound and immediate removal of heat produced by the reaction. At the point where the $SO_3$ contacts the organic compound, there should be a heat transfer surface within 0.5 inch so that long heat transfer through a body of liquid is not required. Furthermore, the reaction proceeds so rapidly that it is important that within a time of less than 0.5 second from introduction, the mixture of organic compound and sulphur trioxide must be subjected to liquid shear against a heat transfer surface or against the monomolecular film of liquid deposited thereon, so that intimate mixing occurs between the components and heat can be extracted through the heat transfer surface. One of the features of the shear is that the moving impeller surface shears the liquid against a heat transfer surface with a relatively close clearance of not more than .0125 inch and preferably not more than .003 inch. These are cylinder impeller clearances. The conditions favorable to heat transfer because of the turbulence caused by the impeller and the close mechanical clearance wiping the product film on the heat transfer plate.

The organic compound is most susceptible to side reactions and to charring when the sulphur trioxide is first brought in contact with it, and therefore we believe it is important in many cases to maintain a lower temperature at the first increment of sulphur trioxide addition than the the temperature which is maintained at the later increments. This can be accomplished by maintaining a lower temperature on the heat transfer medium at the first increment or more rapidly flowing the heat transfer medium at the first increment or a combination thereof. Thus, in a reaction between $SO_3$ and tridecylbenzene we find that usually good results are obtained if a temperature of 20 to 30 degrees centigrade is maintained at the first point of sulphur trioxide addition, a temperature 45 to 50 degrees centigrade is maintained at the next four points of sulphur trioxide addition, and a temperature of 80 to 90 degrees centigrade is maintained at the next four points of sulphur trioxide addition used in the particular process.

In any case, we find that it is important to add the sulphur trioxide in at least four steps at at least four different impellers adjacent corresponding heat transfer surfaces, although in the preferred embodiment we employ nine or ten such different incremental additions each at a different impeller and adjoining a different heat transfer system. Our experiments indicate that addition in several increments as above described reduces the quantity of unreacted organic compound present and reduces side reactions and charring of the organic compound.

Very superior results are obtained by adding a relatively small amount of sulphur trioxide in the first increment and increasing the quantities added at the subsequent increments. For best results we find that the increase should follow a geometrical progression. Thus, if the quantity of $SO_3$ introduced in the first orifice is measured by a factor of 2, that at the succeeding orifices will be measured by factors of 4, 8, 16, 32, 64, etc. Good results from these progressively increasing incremental additions are obtained even without precisely following the geometrical progression, and this general principle can be adhered to with a tolerance of ±50% the quantity which the geometrical progression would require at a particular orifice, and still benefit is obtained.

In actual experiments adding the $SO_3$ incrementally in six steps, and with progressive increase in successive additions, we have found that the quantity of unreacted organic compound can be cut to 5% in one example and 2% in another example, as compared with very much higher values (30% and more) obtained from single additions of sulphur trioxide. At the same time the color was lighter and anhydride formation was reduced.

Optionally but very desirably, a gas containing oxygen is blown into the liquid organic compound at or adjacent the point where the first $SO_3$ increment is added, preferably right after the addition of the first increment. The presence of the gas containing oxygen favors more complete reaction with the sulphur trioxide. Thus, in a particular case where without the presence of air the reaction was only 90% complete, in the presence of air the yield was 98%.

Caution should be exercised in respect to this gas. Oxygen itself if used in 100% concentration presents danger of detonation which might destroy the apparatus, but oxygen can be used in admixture with inert gases such as argon or carbon dioxide which reduce the danger of detonation.

For most purposes air is quite satisfactory. We find that a feed of air of between 0.013 and 0.109 cubic feet of air at standard conditions and preferably about 0.041 cubic feet of air at standard conditions per pound of reactant is satisfactory. This quantity was effective with 40% excess $SO_3$ above the stoichiometric requirement. The addition of the air reduced the quantity of unreacted organic compound (alkane 60) from 14% to 8% by weight although the color of the reaction product was slightly darker.

In some reactions it is desirable to eliminate the presence of water entirely and employ an anhydrous reaction system. Sulphur trioxide, however, has a tendency to form anhydrides in which sulphur trioxide reacts with itself in producing rings or a chain, thus increasing the sulphur trioxide used in the reaction. This can be inhibited by introducing water at or adjacent to the point where the sulphur trioxide is first introduced. The addition of the water not only prevents the formation of anhydride, but tends to moderate the reaction and produce a somewhat lighter oil, without introducing the great quantities of water or causing other disadvantages which would be present in using oleum. We find that good results can be obtained using water in proportions of 0.1 to 3% by weight of the total quantity of throughput, preferably 2 to 3% by weight. This exerts a considerable moderating effect on the reaction. Hence, water can of course be introduced in several stages, for example, increments can be introduced at each point at which the $SO_3$ is introduced if desired.

The process of the invention can be applied for reaction with sulphur trioxide of a wide variety of organic compounds. Alkanes can be reacted, including saturated and unsaturated aliphatic hydrocarbons, with straight or branched carbon chain, and without regard to chain length providing they can be reduced to a liquid. The invention is widely applicable particularly to petroleum fractions. An alkane to which the invention is widely applicable is alkane 60 mentioned below.

The invention is also applicable to producing the reaction with carboxylic acids. Suitable alpihatic acids are acetic, propionic, butyric, oleic, linolenic and linoleic, and succinic and succinic anhydride. A suitable aromatic acid is benzoic acid.

The invention is widely applicable for producing reactions between aliphatic esters and sulphur trioxide, especially the fatty oils, such as castor, soya bean, peanut, tallow, sperm, linseed, neat's-foot and cod liver.

The invention is also applicable to reacting sulphur trioxide with alcohols, such as ethylene glycol, glycerol, lauryl alcohol and dodecyl alcohol.

The invention is applicable also to reactions with ketones, such as methyl ethyl ketone and methyl isobutyl ketone.

The invention can be applied to reactions with amino compounds such as aniline, toluidine, and xylidine. Aldehydes may be reacted with sulphur trioxide according to the invention, suitable materials being formaldehyde and acetaldehyde. The invention is also applicable to reactions between sulphur trioxide and nitriles, such as acetonitrile.

The invention can be employed in sulphonation, sulphation and sulphamation of a wide variety of aromatic compounds, which are either carbocyclic or heterocyclic. Suitable examples are the aromatic hydrocarbons, such as benzene, naphthalene, toluene, xylene, styrene; the nitrohydrocarbons, such as nitrobenzene and nitrotoluenes; and the phenols such as phenol, cresol and naphthol.

The invention can also be applied to reaction between sulphur trioxide and alkyl compounds such as dodecyl benzene, alkylated naphthalene, 3-phenyl propionic acid, 3-phenyl stearic acid and 3-phenyl caprioic acid.

Heterocyclic compounds will react, such as pyridine, furan, thiophene, quinoline and carbazole.

Silicone oils will react with $SO_3$ according to the invention.

The process of the invention can be followed by neutralization, for example with a base such as sodium, potassium or ammonium hydroxide in water, or an organic base such as an amine, such as triethanolamine.

In FIGURE 1 I show a suitable apparatus according to the present invention. A reactor suitably in the form of two separate reactor units 20 and 20', to be described, has a succession of heat transfer plates 21 to $21^{11}$, to be described, interposed by impeller chambers 22 to $22^9$ to be described. A tank 23 contains an organic compound in liquid form to be sulphonated, sulphated or sulphamated, and this is withdrawn through piping 24, a flowmeter 25 and a metering pump 26, pressure being indicated at 27, and introduced at 28 at the inlet end of the reactor 20.

Liquid sulphur trioxide is contained in a storage tank 30 provided with a vent 31 protected from moisture by a drying tube 32. Liquid $SO_3$ is withdrawn through a valve 33 and piping 34 through a flowmeter 35 into branch pipes 36 and 36' supplying the reactors 20 and 20'. The feed is accomplished by metering pumps 37 or 37' through valves 38 and 38' to individual branches 40 to $40^8$ each of which enters radially into one of the impeller chambers 22 to $22^9$. Each of the branches has in it a valve 41 to control flow and a flowmeter 42 to measure it. Each of the branch pipes 36 and 36' has an accumulator 43 beyond the pump 37 or 37' set off by valves 44 and 45. The accumulator maintains gas pressure in the system to eliminate pump pulsations.

Each of the branches 36 and 36' is also connected by piping through a valve 46 to a container of concentrated sulphuric acid 47 to permit testing of flow.

As shown in FIGURES 2, 3 and 4, the reactor has a central shaft 48 turning by a suitable motor in suitable bearings not shown and has keyed thereon a series of impellers 50, best seen in FIGURES 2 and 3, which are in cylindrical chambers 51, the impellers having in the middle of the cylindrical chamber a disc 52 passing from the shaft to a distance of about a maximum of ⅛ inch from the interior of the chamber wall and preferably a maximum of $\frac{1}{16}$ inch, and integral therewith and on either side of the disc 52 there are placed involute blades 53 of which four are shown, which on one side of the disc 52 extend in the forward direction and on the other side extend in the trailing direction. The impeller may turn in either direction but best results have been obtained with the impeller turning in the trailing direction on the side which first encounters the reaction mixture. The blades 53 extend close to the interior of the circumferential wall of the chamber 51, the clearance at 54 being suitable a maximum of ⅛ inch and preferably a maximum of $\frac{1}{16}$ inch.

Extending radially inwardly suitably at the middle of the length of the impeller chamber is a nozzle 55 which is suitably of round uniform diameter and in a device having a throughput of about 2 grams per minute in the first port will conveniently be of a diameter of about 0.015 inch as previously explained. This nozzle 65 tends to direct the jet of liquid sulphur trioxide on the outer ends of the impeller blades 53 so that the liquid composed of the mixture of organic compound and sulphur trioxide immediately undergoes shear in the clearance space 54. At this instant and throughout its flow through each of the impeller chambers the liquid is always within half an inch of one of the heat transfer surfaces 56 of the next heat transfer plate on either side as shown in FIGURE 4. This heat transfer plate, here shown as 21', has an annular space 57, closed at the interior by a hub 58, the hub 58 leaving adequate clearance 60, FIGURE 2, between its interior and the shaft 48, so that the reaction mixture can flow from one impeller to another between the shaft and the hub 58 in the space 60. The ends of the space 57 are closed by face plates 61 which when welded inside and out to the chamber 21' and to the hub 58' form a closed space in which the heat transfer medium can circulate from an inlet connection at 62 to an outlet connection at 63.

Thus, the organic chemical is introduced at 28 as shown in FIGURE 2 and flows outwardly through the blades of one impeller and in heat transfer relation with one heat transfer plate, undergoes shear at the outside between the blades and the interior of the cylindrical impeller chamber, comes in contact with a radially inwardly directed jet of sulphur trioxide, is carried over the outer edge of the divider disc 52 and undergoes shear between the outer edges of another set of blades 53 and the circumferential interior of the impeller chamber and then in flowing radially inwardly is forced in the clearance space 66 along the face of the heat transfer surface 56 and in contact with its monomolecular liquid layer while shear takes place between the side of the blade of the impeller and the heat transfer surface. Clearance at 66 is regulated so that it is between 0.002 and 0.0125 inch so that very effective liquid shear and very effective turbulence are obtained for heat transfer purposes. Finally, the mixture of organic compound and sulphur trioxide which has now begun to react passes into the space 60 between the hub 58 and the shaft 48.

Thus, in considerably less than a half of a second the reaction mixture is brought into contact and in liquid shear relation with the heat transfer surface 56. This is repeated at each step along the reactor system. The reaction mixture passes from reactor to reactor by piping 66. The reactor is held together by bolts 59.

Referring to FIGURE 1, heat transfer medium, suitably water, from a source 67 at an adequately low temperature is pumped by a metering pump 68 through piping 62 into each of the heat transfer plates 21 to $21^{11}$ and then pumped out through piping 63 and valve 64 to a sump 65.

If it is desired to operate the system without introducing any oxygen containing gas and without introducing any water, then it will be evident that the partially reacted mixture passes through pipe 66 to enter the second reactor unit 20'. Successive increments of $SO_3$ are added at impellers 22 to $22^8$, the quantity being increased in geometrical progression at the later station in the preferred embodiment.

In many cases it is desired to accomplish neutralization in the system, using a suitable base such as sodium hydroxide in water, and for this purpose the last impeller chamber $22^9$ has a radial inlet 67 which receives neutralizing agent from a suitable source controlled by a metering pump not shown, supplied through a valve 70 and a flowmeter 71.

The final neutralized product leaves by a pipe 72 through a valve 73 to a storage tank 74 provided with a vent 75. A pressure gauge is shown at 76, and by valve 77 a sample can be obtained at 78.

In many cases it is desired to introduce air or other oxygen containing gas to promote completeness of reaction. This is suitably accomplished in the first impeller chamber 22 by withdrawing air from an air supply 80 under pressure and directing it at a controlled rate through a flowmeter 81 to a radial inlet 82. It is often desirable to introduce air also in the second impeller chamber through a flowmeter 81' and a radial inlet 82'.

In some cases also to moderate the reaction and prevent the formation of anhydride, and whether or not air is introduced, it is desired to introduce water from a water supply 83 under suitable pressure through valve 84, a flowmeter 85 and into a radial inlet 86 in the first impeller chamber 22.

The quantities of air and water which may be suitable have been discussed above.

An extensive series of experiments was carried out using an alkyl benzene having a saturated hydrocarbon side chain of 10 to 15 carbon atoms which except that it is a crude product may be considered to be tridecylbenzene having a specification as follows:

| | |
|---|---|
| Gravity, API | 29.5 to 31.0 |
| Viscosity at 100° F. SU (ASTM D88) | 44 to 50 |
| Color, Saybolt (ASTM D156) (minimum) | +19 |
| Bromine number (maximum) | 0.5 |
| Aniline point (ASTM D611) ° F | 46 to 56 |
| Sediment and water | Nil |
| Appearance, clear at 70° F. | |
| Distillation, ° F.— | |
| 5% recovered | 530–535 |
| 95% recovered | 560–565 |
| Doctor test (FS 52–3) | Negative |
| Molecular weight (approximate) | 246 |
| Flash point (Pensky Marten) ° F | 255–260 |

FIGURES 5 to 8 plot the results obtained by sulphonating alkane 60 according to the present invention under various conditions therein set forth.

Similar results were obtained in sulphonating docyelbenzene.

FIGURE 5 plots free compound as a percent of throughput against percent of excess $SO_3$ over the stoichiometric requirement. The test was run on alkane 60 at a temperature of sulphonation of about 50° centigrade and with a throughput of about 300 grams per minute. It illustrates that with an excess of 20% $SO_3$ the free compound constituted about 19% of the throughput but with an excess of $SO_3$ of 55% the free compound which went through without reaction was reduced to about 4% by weight of the throughput.

FIGURE 6 plots free compound in percent of the throughput as ordinate against throughput in grams per minute and shows that as the throughput increases the unreacted component increases in almost a straight line relation. These tests were run using alkane 60 with 20% by weight excess $SO_3$ at a temperature of about 55° centigrade.

FIGURE 7 plots the free compound in percent of the throughput as ordinate and air injected in cubic feet per hour as the abscissa, the test being run on sulphonation of alkane 60 with $SO_3$ with a 20% by weight excess of $SO_3$ at an operating temperature of 75° centigrade and with a throughput of 300 grams per minute. This indicates that within the range of the test the quantity of unreacted compound was substantially independent of the quantity of air injected.

FIGURE 8 plots as ordinate the free compound in percent of throughput and as abscissa the maximum temperature within the reactor in degrees centigrade, the experiments being run on alkane 60 sulphonated with $SO_3$ with a 20% by weight excess of $SO_3$ and a throughput of 195 grams per minute. This indicates that as the reaction temperature increases, the quantity of unreacted organic compound reduces.

Having thus described our invention, what we claim as new and desire to secure by Letters Patent is:

1. A process of reacting sulphur trioxide in liquid form with an alkyl benzene, which comprises progressing said alkyl benzene in liquid form continuously through at least four reaction zones in sequence,
projecting into said alkyl benzene in each of said reaction zones at a speed of at least 0.35 feet per second a jet of liquid sulphur trioxide as such,
cooling the mixture of alkyl benzene and sulphur trioxide in each reaction zone at a point not more than 0.5 inch from the point at which the liquid sulphur trioxide contacts the alkyl benzene,
within a time of less than 0.5 second from introduction of the sulphur trioxide into the alkyl benzene in each reaction zone shearing the liquid mixture of sulphur trioxide and alkyl benzene in a liquid film not in excess of 0.0125 inch thick,
and thereby mixing the alkyl benzene and liquid sulphur trioxide and extracting heat of reaction therefrom so as to avoid explosion and obtain a reaction product which is light in color.

2. A process of claim 1, which comprises projecting into said alkyl benzene said liquid sulphur trioxide in at least nine reaction zones according to claim 1.

3. A process of claim 1, which comprises increasing the amount of sulphur trioxide projected in the later reaction zones to that projected in the earlier reaction zones in geometrical progression.

References Cited

UNITED STATES PATENTS

| | | |
|---|---|---|
| 2,768,199 | 10/1956 | Lurtz et al. |
| 3,200,140 | 8/1965 | Sowerly. |
| 3,259,645 | 7/1966 | Brooks et al. |

FOREIGN PATENTS 219,651   4/1957   Australia.

LEON ZITVER, *Primary Examiner.*

H. ROBERTS, *Assistant Examiner.*

U.S. Cl. X.R.

260—513, 686, 481, 502.6, 459, 513.6, 465.1, 512, 400, 315, 508, 283, 294.8, 329